July 2, 1946.   F. C. REGGIO   2,403,399
POWERPLANT
Filed March 29, 1941   3 Sheets-Sheet 1
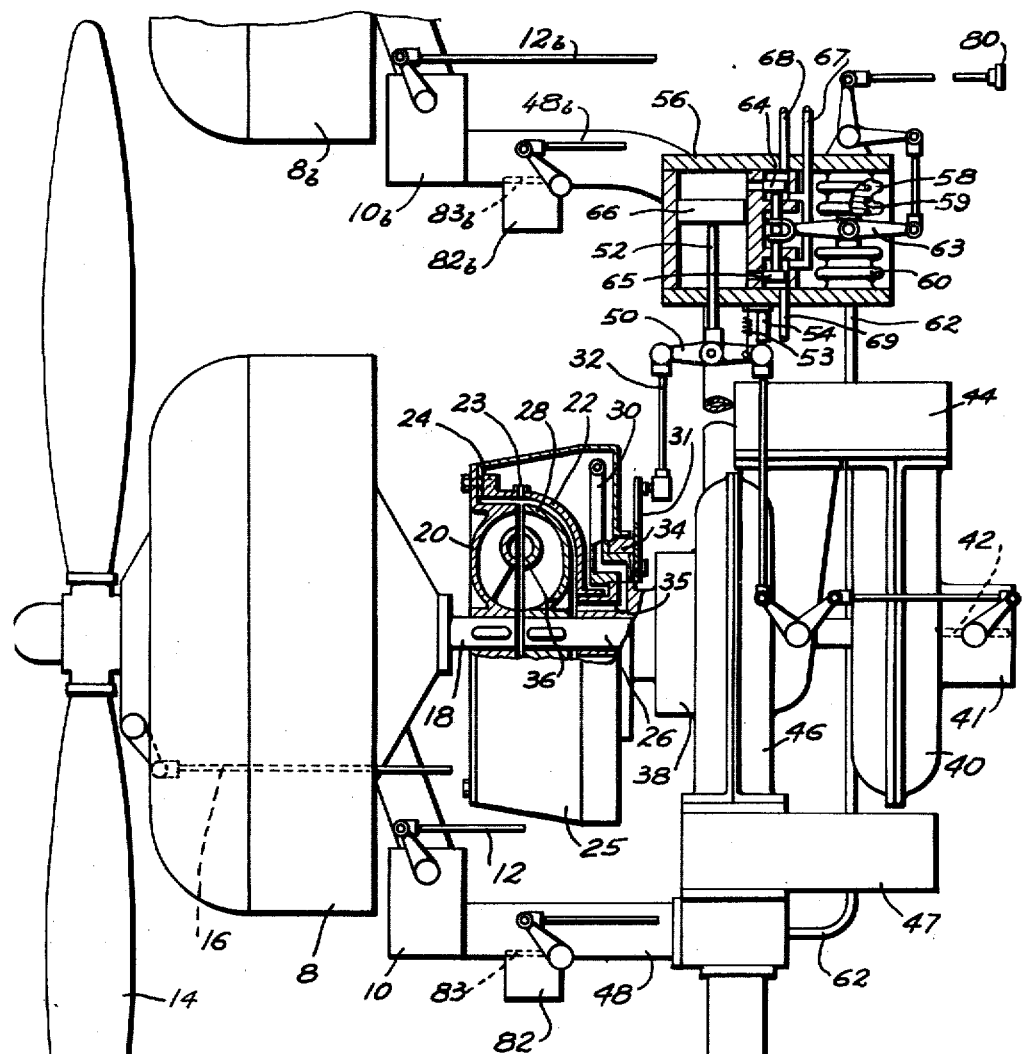
Fig. 1
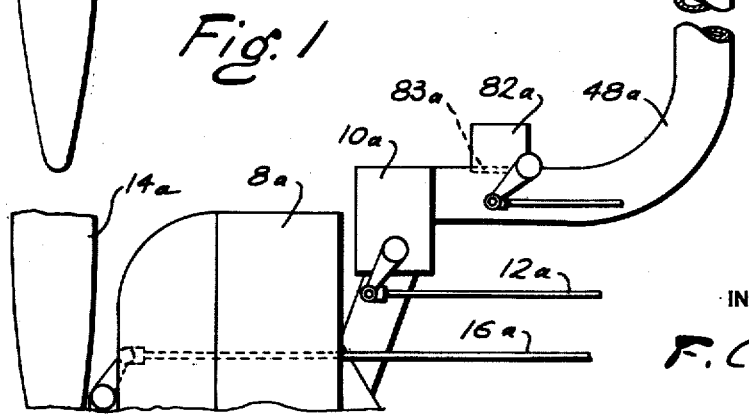
INVENTOR
F. C. Reggio

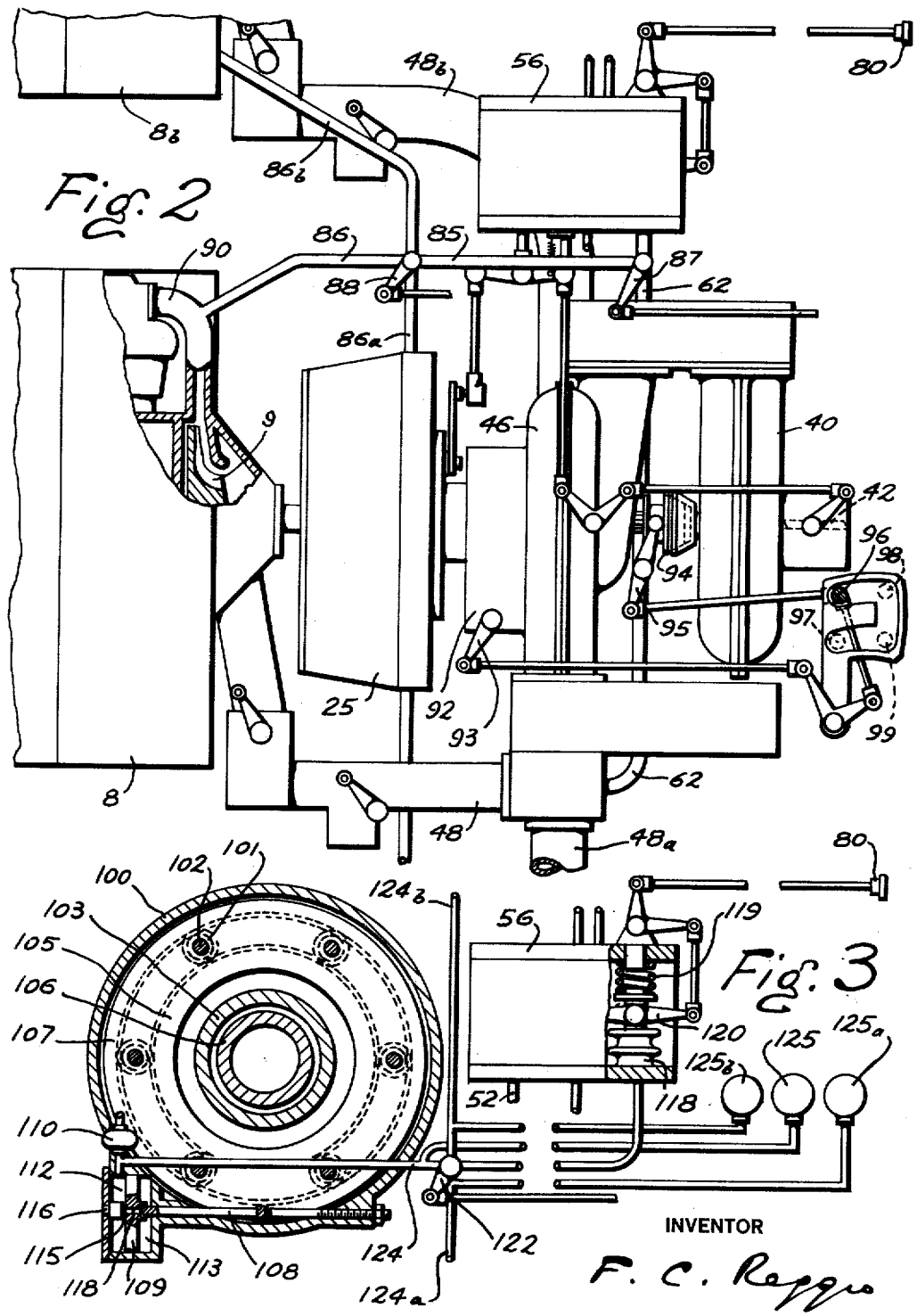

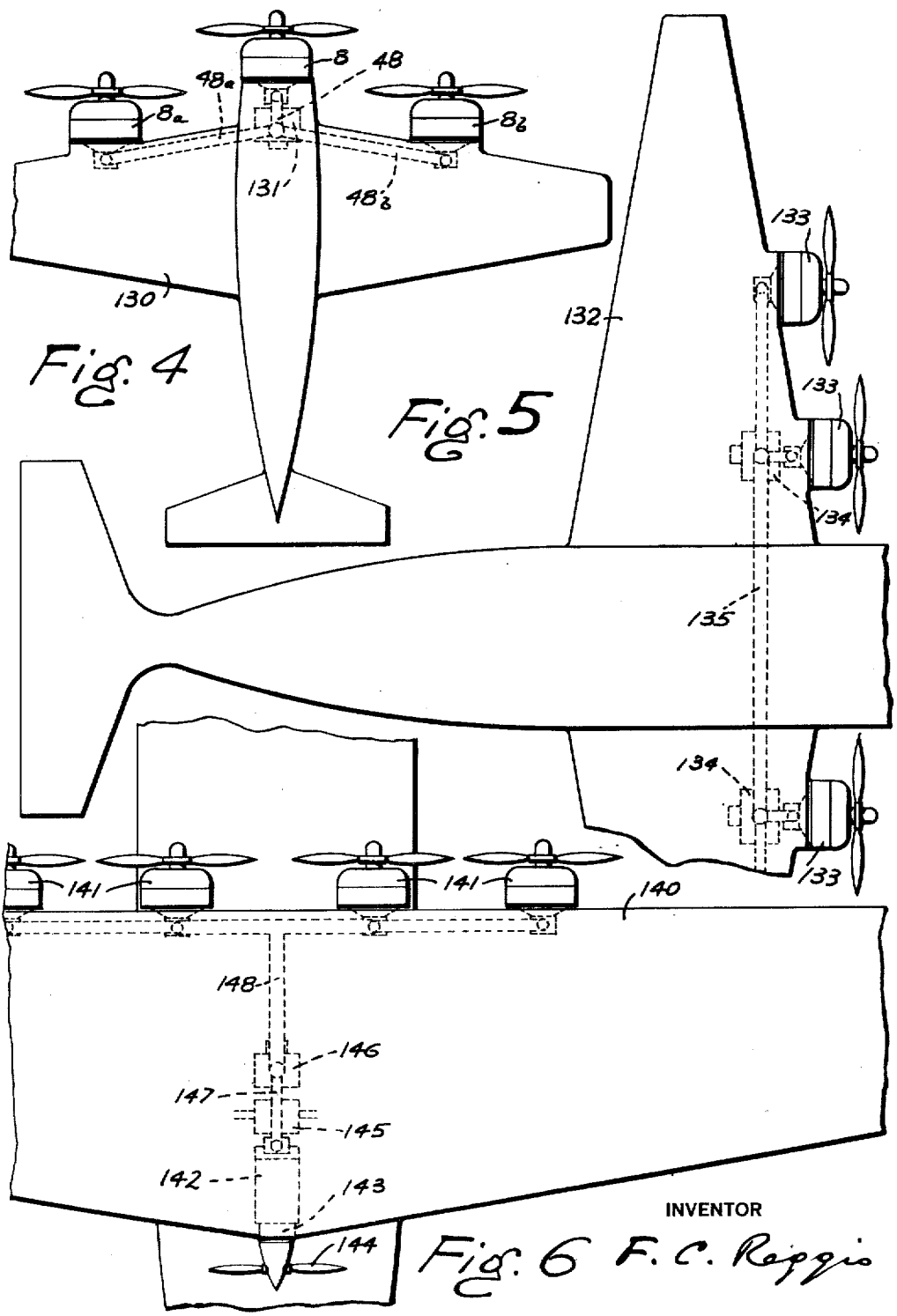

Patented July 2, 1946

2,403,399

UNITED STATES PATENT OFFICE 2,403,399

POWER PLANT

Ferdinando Carlo Reggio, Detroit, Mich.

Application March 29, 1941, Serial No. 385,806

18 Claims. (Cl. 170—135.6)

This invention relates to supercharged powerplants for aircraft and more particularly to means for driving and for controlling supercharging units, or for regulating the air induction pressure, of aircraft engines. This invention relates to powerplants, and more particularly to means for regulating the air induction pressure, the combustible fuel supply or the torque of said powerplants. The invention is particularly useful in connection with multiengine aircraft powerplants designed for large take-off power output and high altitude ceiling.

One of the objects of the invention is to provide means for economically adjusting the air supply of supercharged powerplants to suit the various operating requirements thereof.

Another object is to eliminate or substantially reduce the large waste of power which occurs in conventional supercharged engines designed for high altitude when operating at part throttle.

A further object is to provide a supercharging unit adapted to be driven from an aircraft powerplant at variable speed for supplying compressed air thereto, and means for adjusting the speed of said unit to control the powerplant air supply.

Another object is to provide in an aircraft powerplant having two or more engines a single throttle valve for controlling said engines uniformly and simultaneously.

Still another object is to provide an aircraft powerplant including two or more engines and a common supercharger delivering air to said engines.

A further object is to provide a single regulating device for the automatic control of two or more engines.

Still another object is to provide, in a powerplant for aircraft, one or more supercharging units adapted to be driven at variable speed from said powerplant to supply air thereto, and means for varying the number of said units which are in operation as well as the speed thereof in dependence on the altitude and powerplant operating conditions.

A still further object is to provide means for automatically regulating the aircraft powerplant, or a preselected operative condition thereof, in dependence upon the adjustment of a control or regulating member.

Further and other objects and advantages will be apparent from the following description in connection with which several embodiments of the invention have been illustrated in the accompanying drawings, in which:

Fig. 1 is a diagrammatic view of a multiengine supercharged powerplant for aircraft including a supercharging unit driven through a variable speed transmission from one of the engines of the powerplant, and regulating devices therefor.

Fig. 2 is a fragmentary diagrammatic view of a modified arrangement of supercharged powerplant.

Fig. 3 is a fragmentary section showing another modified form of the powerplant of Fig. 1.

Fig. 4 to 6 diagrammatically indicate various embodiments of the invention in connection with various multiengine airplanes.

In the following description and in the claims various details will be identified by specific names for convenience, but they are intended to be as generic in the application as the art will permit.

The power output of conventional spark ignition internal combustion engines is dependent on the intake manifold pressure, which is controlled by a throttle valve. When aircraft engines having a supercharger designed for high altitude are operated at part throttle, an important fraction of the power required to drive the supercharger is wasted by throttling, thus decreasing the power available to drive the propeller and causing an objectionable rise in the engine manifold temperature.

A supercharging unit for aircraft powerplant in which a blower is driven at variable speed by an auxiliary motor is described in my copending U. S. patent application Serial Number 188,960 filed Feb. 5, 1938. Such a unit connected with a large powerplant, however, absorbs a considerable amount of power at high altitude and necessitates a rather large and heavy driving motor which would operate under full load at the highest altitude and at part or no load at intermediate and low altitudes. According to one of the preferred embodiments of the present invention, a motor is provided, together with means for connecting said motor with a propeller and, by way of a variable speed transmission, with a supercharging unit, whereby the maximum motor power output may be employed during the take-off, mostly or entirely for driving said propeller, while at high altitude a considerable portion or the totality of said power output may be absorbed by said supercharging unit to increase the altitude ceiling of the aircraft.

The powerplant shown in Fig. 1 includes three engines, indicated by numerals 8, 8a and 8b, each having a carburetor 10, 10a and 10b, provided with a throttle control 12, 12a and 12b, respectively, and connected with a variable pitch propeller 14, 14a and 14b, adjustable to automatically maintain the engine speed at a constant value determined by the adjustment of the speed control 16, 16a and 16b, respectively, this being a known arrangement. The elements 14b and 16b are not shown in Fig. 1.

A driven shaft 18 of engine 8 carries, rotatable therewith, a driving impeller 20, an inner casing 22 having leak-off nozzles 23 and a rotating reservoir 24 of a variable speed hydraulic coupling 25 of the scoop-tube type, which is well known in the art and will be accordingly briefly described. The driven shaft 26 thereof, coaxial with shaft 18, carries the driven impeller or runner 28. Lubricating oil, or other suitable fluid, is contained in coupling 25. The rotating reservoir 24 has a capacity sufficient to hold the content of the working circuit between impeller 20 and runner 28, with which it communicates through leak-off nozzles 23.

At a given speed of the engine 8, the speed of driven shaft 26 is dependent on the amount of oil contained in the working circuit. With this circuit filled up, the speed of shaft 26 assumes its maximum value, while with no oil in the working circuit the shaft 26 remains idle. An adjustable scoop tube 30, extending into the rotating reservoir 24 and controlled by an external lever 31 connected with rod 32 is rotatably mounted on the stationary housing 34 of coupling 25. Oil passes from the working circuit through nozzles 23 and collects in the rotating reservoir 24, from where it is picked up by the scoop tube 30 and returned to the working circuit. The scoop tube 30 is rotatable about an axis parallel to shafts 18 and 26 so that rotation thereof varies the radial adjustment of the open extremity of scoop tube 30. In the fully radially extended position of the latter, substantially all of the oil is returned through conduits 35 and 36 to the working circuit, and maximum output speed is obtained. By lowering rod 32, the scoop tube 30 may be brought into a fully retracted position, so that all of the oil drains into the reservoir 24 and the coupling is completely disconnected. By placing the control rod 32 in any intermediate position, varying quantities of oil are delivered to the working circuit and any desired output speed may be obtained.

A two stage supercharger, driven from shaft 26 through suitable gearing 38, not shown in detail, is provided, including a low pressure centrifugal blower 40 having an air inlet 41 and an inlet pressure regulating valve 42 therein, and an air outlet communicating by way of an intercooler 44 with the inlet of a high pressure centrifugal blower 46. Compressed air is discharged from the outlet of the latter blower through a second intercooler 47 into conduits 48, 48a and 48b connected with the carburetors 10, 10a and 10b of the engines.

The inlet pressure regulating valve 42 is connected by means of suitable lever and linkages with the right hand end of a floating lever 50, the other end of which actuates the upper end of the control rod 32 of the variable speed coupling 25. The median point of lever 50 is mounted on a pivot carried by rod 52. A spring 53, attached to lever 50 and cooperating with a stop 54, tends to keep valve 42 in open position. In the operation of the above described mechanism the pressure in conduits 48, 48a and 48b is controlled by the axial adjustment of rod 52. Assuming said rod to be initially in its extreme upper position, the throttle valve 42 will be open and the scoop tube 30 will be in its extended position, maintaining all of the operating oil in the working circuit of the hydraulic coupling, whereby the speed ratio thereof attains its maximum value.

Assuming the individual carburetor controls 12, 12a and 12b to be all in fully open position, the supercharging unit will discharge the maximum amount of air into conduits 48, 48a and 48b, and the three engines will therefore develop the maximum power output corresponding to the actual values of altitude, engine speed and fuel/air ratio adjustment. Assuming the speed controls 16, 16a and 16b of the engines to be adjusted for the same value of speed, the three engines will develop the same power output, but the propeller 14 of engine 8 will operate with smaller pitch than those of engines 8a and 8b, as it absorbs the power output of its engine minus the power required to drive the supercharging unit.

If now the rod 52 is displaced downwardly, while owing to the action of spring 53 and stop 54 the inlet pressure regulating valve 42 remains in open position, the scoop tube 30 is caused to radially retract, correspondingly reducing the amount of oil in the working circuit of the hydraulic coupling and decreasing the supercharger speed and the air supply of the engines. Continued downward displacement of rod 52 will cause the scoop tube 30 to reach a stop, not shown, corresponding to its fully retracted position, in which the coupling becomes inoperative, and no more power is absorbed by the supercharging unit from engine 8. Thereafter, upon continued downward displacement of rod 52, as the left hand end of the floating lever 50 is prevented from further downward displacement, the floating lever 50 will operate to progressively close the valve 42 and thereby reduce the pressure in conduits 48, 48a and 48b to any value below the surrounding atmospheric pressure. Obviously, when the rod 52 is displaced in the opposite direction back to its initially mentioned position, first the valve 42 will open while the hydraulic coupling is disconnected, and thereafter the supercharger speed will be increased to its maximum value corresponding again to the maximum pressure in conduits 48. The waste of power that would result from driving the supercharging unit at unnecessarily high speed while inlet valve 42 is partially closed is therefore avoided.

It is to be noted that in the foregoing the supercharging unit is assumed to be of the two-stage centrifugal type. Although the above mentioned type appears to be particularly advantageous, it is to be understood that the invention is not limited thereto, but that various other types of supercharger may be employed. If a blower of the positive displacement type be used, the pressure in conduits 48 corresponding to the idling speed of the engines 8 is obviously obtained for a positive value of the blower speed, the blower inlet being unrestricted, whereby the valve 42 and the floating lever 50 becomes unnecessary and the rod 52 may be linked directly to the scoop lever 32.

A pressure regulator, indicated generally at 56, is provided to automatically operate the rod 52. The pressure regulator may be any device adapted to displace rod 52 in response to a change of pressure in conduits 48 or in response to other suitable engine operating condition. In the arrangement shown in Fig. 1 the regulator includes a metallic bellows 58 sealed under vacuum and provided with a spring 59 for expanding said bellows. The latter acts directly against a similar bellows 60, the inside of which communicates by way of duct 62 with the outlet of intercooler 47 where the pressure is substantially the same as in conduits 48. These two bellows act on the median point of a lever 63 to operate pistons 64 and 65 controlling the admission of a fluid under pressure, usually lubricating oil from an engine driven pump, to opposite sides of piston 66 attached to rod 52. The oil under pressure is admitted to the pressure regulator through pipe 67 and discharged at lower pressure by way of pipes 68 and 69.

If bellows 58 and 60 have equal sections, the surrounding atmospheric pressure acts on the two bellows in opposite directions and with equal magnitude so that any change of pressure in conduits 48 operates bellows 60 and in turn the piston 66 and returns the pressure in said conduits to the predetermined absolute value, independently of any variation in altitude. There is provided a control member 80 which may be manually operable, connected with the outer end of lever 63, for setting the resilient load of the spring 59 contained in bellows 58 corresponding to the neutral position of pistons 64 and 65 and thereby the value of the pressure which will be automatically maintained in conduits 48 by the pressure regulator 56. It is to be noted that with bellows 58 and 60 of equal effective sections, for a given adjustment of control member 80 the absolute pressure in conduits 48 will have a constant value within the designed altitude limit, and the power output of engines 8, 8a and 8b, at a given speed thereof, will increase with the altitude owing to the effect of the corresponding decrease of exhaust counter pressure. Instead of a constant absolute pressure in conduits 48, a substantially constant power output of the engines 8 at a given speed thereof, or a power output thereof which varies substantially as a predetermined function of the altitude, may however be obtained with bellows of unequal effective sections.

According to one of the preferred embodiments of the invention, each of the engines 8, 8a and 8b includes a conventional supercharger, such as the supercharger 9 shown in Fig. 2, which may be designed for example for moderate altitude, or for providing the boost required for the rated maximum take-off engine power output in average ground conditions. Each of said engines is also provided with an individual air inlet 82, 82a or 82b having a control valve 83, 83a or 83b respectively, whereby each engine may be either connected with the conduits 48 of the supercharging unit, as shown in Fig. 1 wherein the air inlets 82 are closed by the valves 83, or supplied with air at surrounding pressure through the air inlets 82 when the valves 83 are rotated clockwise to open said air inlets and interrupt the air flow communication between each engine 8 and the corresponding conduit 48. The engines 8 being provided with individual conventional speed and load controls 16 and 12, connected with the well known speed actuated mechanism for adjusting the pitch of propeller 14, and with the engine throttle valve respectively, they may operate independently of the supercharging unit, and in case of failure occurring to the latter the airplane may keep on flying with the engines 8 disconnected from said unit, and decreased altitude ceiling.

With individual air inlets 82 closed by valves 83 and individual throttle controls 12 in fully open position, the induction pressure of the engines 8 is automatically controlled by the regulator 56 in dependence on the adjustment of control member 80. For a "cruising" adjustment of the latter, at low altitude the air pressure in conduits 48 may be lower than the surrounding pressure, in which case the valve 42 is partly closed and the hydraulic coupling is inoperative. Assuming the speed controls 16 to be adjusted for equal engine speeds, the propellers 14, 14a and 14b absorb equal engine torques and have equal pitch. As the altitude increases, first the valve 42 is completely opened, and thereafter the pressure regulator 56 acts to render the hydraulic coupling 25 operative and drive the supercharging unit at correspondingly increasing speed thereby absorbing increasing torque from engine 8 and causing the speed regulator thereof to decrease the pitch of the propeller 14 in order to maintain the engine speed constant. Such speed regulator, not shown in the drawings, is connected with speed control 16 and consists of a well known hydraulically or electrically actuated device controlled by an engine driven flyball mechanism for varying the propeller pitch to automatically maintain the engine speed at a value determined by the adjustment of speed control 16. It is to be noted that while at low altitude and part throttle the power output of engine 8 is transmitted to the propeller 14, at increasing altitude a correspondingly increasing portion of said power is automatically withdrawn from the propeller and applied to drive the supercharging unit.

As previously stated, the hydraulic coupling 25 shown in Fig. 1 is no part of the present invention and has been described merely as a known example of infinitely variable speed transmission for driving the supercharging unit at any speed within the designed limits regardless of the speed of the driving engine 8. It is to be clearly understood, however, that according to the present invention any other suitable type of variable speed transmission or coupling may be substituted for that shown in Fig. 1, in particular a variable speed electric drive, or a variable speed hydraulic drive of the positive displacement type including a pump of variable capacity such for example as described in the U. S. Patent 2,155,455 to Hans Thoma. Such variable speed drives are well known in the art and it is therefore regarded as unnecessary to describe and illustrate them in detail.

As shown in Fig. 1, the pressure regulator 56 controls the air pressure in conduits 48. However if the engines 8 have individual superchargers, the induction pressure at the cylinder intake valves thereof varies with the engine speed. The same pressure regulator 56 may be used to control either the pressure in conduits 48 or the pressure at the cylinder intake valves of the engines by employing the arrangement of Fig. 2, in which the lower bellows of regulator 56 may be selectively connected by way of ducts 62, 85, 86, 86a and 86b and cocks 87 and 88 either with conduits 48 or with the induction manifolds 90 of any of the engines 8.

In order to maintain the operating speed ratio between driven and driving members of the hydraulic coupling 25 within a range of satisfactory efficiency, a two-speed gearing 92, not shown in detail, controlled by a lever 93 may be provided, as shown in Fig. 2, together with clutching means 94 having a control lever 95, between the two stages of the supercharging unit 25, whereby the impeller of the low pressure blower 40 may be either connected with or disconnected from the impeller of blower 46 rotatable with the driven shaft of coupling 25. Both levers 93 and 95 may be actuated by way of suitable linkages from a control member 96 shown in position for the highest altitude, in which both impellers are rotating and the gearing 92 is in "high" ratio. Upon decrease of altitude, or reduction of engine load obtained by varying the adjustment of control member 80, or both, the speed ratio between driven and driving members of coupling 25 may drop to a value corresponding to low efficiency of coupling 25. It may thus be convenient to shift control member 96 into the position indicated by numeral 97, corresponding to the "low" ratio of gearing 92, or disconnect the impeller of blower 40 and adjust gearing 92 in "high" or "low" ratio by shifting member 96 into positions 98 or 99 respectively, whereupon the pressure regulator 56 will automatically react and bring up the speed of the driven shaft of coupling 25 thereby returning the speed ratio thereof to a value corresponding to a higher coupling efficiency.

The intercoolers 44 and 47 may include temperature regulators cooperating with by-pass means, not shown, for keeping the air temperature at the carburetors 10 or in the induction manifold 90 of engines 8 at suitable value.

Instead of being actuated in response to changes of air pressure, the pressure regulator 56 may be made responsive to an operative condition dependent upon the degree of engine supercharging, or engine manifold air pressure, such as an engine mean effective pressure, or to the engine torque, as shown for example in Fig. 3. The latter includes a diagrammatic section through the nose of one of the engines 8 perpendicular to the crankshaft thereof, wherein 100 indicates the engine nose housing containing a reduction gear of the planetary type having planet pinions 101 carried by journals 102 supported by an annular member, not shown, rotatable with the propeller shaft 103 and engaged between a sun gear 105 secured to the crankshaft 106 and an outer ring gear 107. The latter is prevented from rotating relatively to the engine nose 100 by means of an axial extension 108 of a pressure loaded piston 109 for providing a hydraulic torque meter, this being a known device. An engine driven pump 110 discharges oil under pressure into chamber 112 at one side of piston 109 for acting against the tangential load, proportional to the propeller torque, transmitted thereto by the outer ring gear 107. Oil escapes from chamber 112 to the low pressure chamber 113 by way of a restricted passage 115, defined by a stationary dowel 116 and the slidable piston 109, whereby the effective area of said passage is dependent on the distance between piston 109 and cover 116, and duct 118. Piston 109 is normally in equilibrium between the opposite loads transmitted thereto by the propeller torque and the oil pressure in chamber 112. An increase of torque causes a displacement of piston 109 toward the left thereby reducing the effective area of restricted passage 115 and increasing the oil pressure in chamber 112 until the equilibrium of piston 109 is reestablished.

A resilient bellows 118, the inside of which communicates with the pressure chamber 112, acts against a spring 119 to operate a lever 120, similar to lever 63 of Fig. 1, for actuating through the servo motor of pressure regulator 56, already described in detail, the rod 52 thereof and cooperating parts, not shown in Fig. 3, and in turn controlling the supercharging unit to automatically maintain the propeller torque of the engine connected with bellows 118 constant at a value determined by the adjustment of control member 80. Preferably bellows 118 will be connected, by way of ducts 124, 124a and 124b and cock 122, with an engine not driving the supercharging unit. All of the engines connected with the same system of supercharging conduits 48, if similar and adjusted for the same speed, will obviously transmit to the cooperating propeller equal torques, with exception of the engine driving the supercharging unit. Pressure gages 125, 125a and 125b connected with the pressure chambers 112 of the reduction gear of the various engines will indicate the propeller torques thereof. The difference in torque between the engine driving the supercharging unit and the other engine or engines indicates the torque absorbed by said supercharging unit.

The torque regulator may be arranged in such a manner that the oil pressure in the low pressure chamber 113 is kept substantially constant, independently of changes of altitude. This may be obtained for example by using a conventional spring-loaded check valve in the oil return line between chamber 113 and the engine oil sump. If at the same time the pressure surrounding bellows 118 varies with changes of surrounding atmospheric pressure, then the engine torque corresponding to a given adjustment of control member 80 automatically decreases with an increase of altitude. Conversely, the regulator may be so constructed that the bellows 118 thereof contained in housing 56 is surrounded by a fluid, for instance lubricating oil, maintained at substantially constant pressure, while the pressure in chamber 113 varies directly with the surrounding pressure. In the latter case the engine torque is caused automatically to increase with an increase of altitude. It is therefore apparent that the torque regulator 56 of Fig. 3 may be so constructed as to cause the engine torque either to increase, or decrease, or remain constant, upon an increase of altitude, the result being similar to that already pointed out in connection with the manifold pressure regulator of Fig. 1 in which bellows 58 and 60 may have unequal or equal effective diameters.

The total number of engines connected with a supercharging unit may obviously vary to suit the airplane requirements. Fig. 4, for example, shows an airplane having three engines 8, 8a and 8b, connected by way of conduits 48, 48a and 48b with a supercharging unit indicated diagrammatically in 131 and including the variable speed drive, the supercharger proper and the controls and regulating means therefor. Said unit is driven from the central engine 8. As already stated, each of the three engines is provided preferably with individual blower and equipment enabling its operation up to moderate altitude independently of the supercharging unit 131.

Fig. 5 shows an airplane 132 having four engines 133 and two supercharging units 134, each of the latter driven from one of said engines. Air conduits 135 are provided whereby each of said supercharging units may be connected with each of said engines. Preferably, arrangements are provided whereby the engines 133 may operate either independently of said supercharging units 134, or with one or both of said units 134 in action.

Fig. 6 shows an aircraft 140 having four main engines 141 and an auxiliary motor 142, preferably liquid cooled, which may be coupled by way of a clutch diagrammatically indicated at 143 with a variable pitch propeller 144 whereby the power output of said auxiliary engine may be fully utilized for supplementing the take-off power of the aircraft. Means may be provided for driving from motor 142 auxiliary units, indicated at 145, as well as the supercharging unit 146 for supplying compressed air through conduits 147 and 148 to said motor 142 and engines 141 respectively.

While most of the engines are shown in the drawings as air cooled-radial engines and are provided with carburetors, they may obviously be of any other suitable type, such as in-line, liquid cooled engines and may be provided with fuel injection. These embodiments of the invention have been shown merely for purpose of illustration and not as a limitation of the scope of the invention. It is therefore to be expressly understood that the invention is not limited to the specific embodiments shown, but may be used in various other ways, and various modifications may be introduced to suit different requirements, and that other changes, substitutions, additions and omissions may be made in the construction, arrangement and manner of operation of the parts within the limits or scope of the invention as defined in the following claims.

Certain features disclosed herein are claimed in my copending patent application Serial No. 592,419, filed May 7, 1945, for Engine regulating means.

What I claim is:

1. An engine supercharger, means for driving the latter at any speed within limits, and means responsive to the engine torque and to the atmospheric pressure for controlling said speed thereof.

2. An aircraft power plant including engines, a gear-driven blower in each of said engines, one supercharger, conduit means connecting said supercharger and blowers, means for driving said supercharger at infinitely variable speed, pressure responsive means to control the speed of said supercharger, and means for connecting said pressure responsive means either with said conduit means or with the manifold of any of said engines.

3. An engine having a manifold, a gear-driven blower discharging air into said manifold, a variable speed supercharger, conduit means between said supercharger and blower, pressure responsive means for controlling the speed of said supercharger, and means for connecting said pressure responsive means either with said manifold or with said conduit.

4. An engine, a supercharger, means for driving said supercharger at variable speed, and torque responsive means to control the speed of said supercharger.

5. An engine, a supercharger, a variable speed drive for the latter, supercharger speed control means, manual control means, torque responsive means, and an operative connection between said three means.

6. An engine, a supercharger, a variable speed drive for the latter, supercharger speed control means, throttle means, torque responsive means, and an operative connection between said three means.

7. An engine, a supercharger, a variable speed drive for the latter, supercharger speed control means, throttle means, manual control means, torque responsive means, and an operative connection between said four means.

8. An engine, a supercharger, a variable speed transmission therebetween, and engine torque responsive means to control said transmission.

9. In an aircraft having engines, variable pitch propellers driven from said engines and governing means controlling the pitch thereof to keep said engines at the same speed, one supercharger supplying air to said engines, one throttle valve common to said engines, a variable-speed hydraulic transmission driving said supercharger from one of said engines, transmission speed ratio control means, means responsive to the induction pressure of one at least of said engines for controlling said throttle valve and speed ratio control means, and means for controlling the operative setting of said induction pressure responsive means during flight.

10. In an aircraft having engines, a gear-driven supercharger in each of said engines, variable pitch propellers driven from said engines, and governing means controlling the pitch of said propellers to keep the speed of said engines at the same value, one additional supercharger delivering air to said engines, one throttle valve common to said engines, a variable-speed hydraulic transmission driving said additional supercharger from one of said engines, transmission speed ratio control means, means responsive to the manifold pressure of one of said engines for controlling said throttle valve and speed ratio control means, and means for controlling the operative setting of said manifold pressure responsive means during flight.

11. In an aircraft having engines, variable pitch propellers driven from said engines, and means for controlling said pitch thereof to keep said engines at the same speed, one supercharger delivering air to said engines, one throttle valve common to said engines, a variable-speed transmission driving said supercharger from one of said engines, transmission speed ratio control means, means responsive to an operative condition of one of said engines and to the atmospheric pressure to control said speed ratio control means and throttle valve, and manual control means for altering the operative adjustment of said operative condition and atmospheric pressure responsive means during flight.

12. An engine, a supercharger therefor, a variable-speed hydraulic transmission therebetween, transmission ratio control means, a throttle valve, and engine operative condition responsive means actuating said valve and control means whereby said supercharger is caused to rotate at effective speed only when said valve is in substantially fully open position.

13. An engine, a supercharger therefor, a variable speed hydraulic transmission therebetween, transmission ratio control means, a throttle valve, and engine operative condition and atmospheric pressure responsive means actuating said valve and control means whereby said valve is kept fully open when said supercharger revolves at effective speed.

14. An engine, a supercharger therefor, a variable speed hydraulic transmission therebetween, transmission ratio control means, a throttle valve, atmospheric pressure and operative condition responsive means actuating said valve and control means whereby said valve is kept fully open when said supercharger is revolving at effective speed, and manual control means for altering the operative setting of said responsive means during operation.

15. An engine, a gear-driven blower supplying fluid to said engine, a supercharger delivering fluid to said blower, means for driving said supercharger at infinitely variable speed, means responsive to the pressure of said fluid between said blower and engine to control the speed of said supercharger, control means adjustable during operation, and an operative connection between said control means and said pressure responsive means whereby the operative setting of said pressure responsive means is determined by the adjustment of said control means.

16. An engine, a gear-driven blower delivering fluid to said engine, a supercharger supplying fluid to said blower, a variable speed hydraulic transmission for driving said supercharger from said engine, a throttle, means responsive to the atmospheric pressure and to the fluid pressure between said blower and engine to control the speed ratio of said transmission and the adjustment of said throttle, and means operable during flight to alter the operative adjustment of said pressure responsive means.

17. In combination with an engine having fuel supply control means, means responsive to the surrounding atmospheric pressure and to the engine torque, control means, and an operative connection between said three means for actuating said fuel supply control means to regulate said engine torque as a preselected function of the surrounding atmospheric pressure and of the adjustment of said control means.

18. In combination with an engine having fuel supply regulating means, fluid containing means, means for varying the pressure in said containing means with changes in an operative condition dependent upon the engine fuel supply, control means, means responsive to the surrounding atmospheric pressure and to the pressure in said containing means, and an operative connection between said first and said last two mentioned means for actuating said fuel supply regulating means to keep said operative condition at a value determined by the surrounding atmospheric pressure and the adjustment of said control means.

FERDINANDO CARLO REGGIO.

Certificate of Correction

Patent No. 2,403,399.        July 2, 1946.

FERDINANDO CARLO REGGIO

It is hereby certified that errors appear in the printed specification of the above numbered patent requiring correction as follows: Column 1, line 1, beginning with the words "This invention" strike out all to and including the word and period "engines." in line 5, same column; column 8, line 48, after "diameters." insert the following paragraph—

*The powerplant arrangement illustrated in Fig. 1, in particular where the engines 8 include a conventional gear driven supercharger, not shown, is especially suitable for aircraft designed for operation at high altitude. When this powerplant is operating under cruising power at moderate or low altitudes, the centrifugal blowers 40 and 46 may become unnecessary, in which case the regulator 56, owing to the action of spring 53, will cause these blowers to remain stationary, or rotate at relatively low speed, and will automatically control or regulate the engines 8 in dependence upon the adjustment of control member 80 by angularly adjusting the throttle or pressure regulating valve 42.* and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.* ative setting of said responsive means during operation.

15. An engine, a gear-driven blower supplying fluid to said engine, a supercharger delivering fluid to said blower, means for driving said supercharger at infinitely variable speed, means responsive to the pressure of said fluid between said blower and engine to control the speed of said supercharger, control means adjustable during operation, and an operative connection between said control means and said pressure responsive means whereby the operative setting of said pressure responsive means is determined by the adjustment of said control means.

16. An engine, a gear-driven blower delivering fluid to said engine, a supercharger supplying fluid to said blower, a variable speed hydraulic transmission for driving said supercharger from said engine, a throttle, means responsive to the atmospheric pressure and to the fluid pressure between said blower and engine to control the speed ratio of said transmission and the adjustment of said throttle, and means operable during flight to alter the operative adjustment of said pressure responsive means.

17. In combination with an engine having fuel supply control means, means responsive to the surrounding atmospheric pressure and to the engine torque, control means, and an operative connection between said three means for actuating said fuel supply control means to regulate said engine torque as a preselected function of the surrounding atmospheric pressure and of the adjustment of said control means.

18. In combination with an engine having fuel supply regulating means, fluid containing means, means for varying the pressure in said containing means with changes in an operative condition dependent upon the engine fuel supply, control means, means responsive to the surrounding atmospheric pressure and to the pressure in said containing means, and an operative connection between said first and said last two mentioned means for actuating said fuel supply regulating means to keep said operative condition at a value determined by the surrounding atmospheric pressure and the adjustment of said control means.

FERDINANDO CARLO REGGIO.

Certificate of Correction

Patent No. 2,403,399.  
July 2, 1946.

FERDINANDO CARLO REGGIO

It is hereby certified that errors appear in the printed specification of the above numbered patent requiring correction as follows: Column 1, line 1, beginning with the words "This invention" strike out all to and including the word and period "engines." in line 5, same column; column 8, line 48, after "diameters." insert the following paragraph—

*The powerplant arrangement illustrated in Fig. 1, in particular where the engines 8 include a conventional gear driven supercharger, not shown, is especially suitable for aircraft designed for operation at high altitude. When this powerplant is operating under cruising power at moderate or low altitudes, the centrifugal blowers 40 and 46 may become unnecessary, in which case the regulator 56, owing to the action of spring 53, will cause these blowers to remain stationary, or rotate at relatively low speed, and will automatically control or regulate the engines 8 in dependence upon the adjustment of control member 80 by angularly adjusting the throttle or pressure regulating valve 42.* and that the said Letters Patent should be read with these corrections therein that the same may conform to the record of the case in the Patent Office.

Signed and sealed this 29th day of October, A. D. 1946.

[SEAL]

LESLIE FRAZER,  
*First Assistant Commissioner of Patents.*